United States Patent Office
3,546,240
Patented Dec. 8, 1970

3,546,240
NITROGEN HETEROCYCLIC DERIVATIVES
OF TRICYCLOHEXYLTIN
Donald E. Bublitz, Concord, Calif., assignor to The Dow
Chemical Company, Midland, Mich., a corporation of
Delaware
No Drawing. Filed July 31, 1968, Ser. No. 748,976
Int. Cl. C07d 49/36, 55/04
U.S. Cl. 260—299                                   6 Claims

ABSTRACT OF THE DISCLOSURE

Nitrogen heterocyclic derivatives of tricyclohexyltin wherein the nitrogen heterocycle is benzotriazole, benzimidazole, imidazole, or substituted imidazole containing up to three substituents selected from lower alkyl and phenyl, said derivatives being useful as pesticides.

---

The present invention relates to novel and useful nitrogen heterocyclic derivatives of tricyclohexyltin wherein the the nitrogen heterocycle is benzotriazole, benzimidazole, imidazole, or substituted imidazole containing up to three substituents selected from lower alkyl and phenyl. These compounds are representable by the following Formula I:

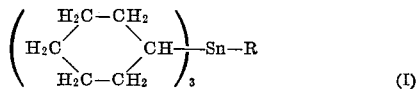

(I)

In this and succeeding formulas, R is 4,5-benzotriazol-1-yl, 4,5 - benzimidazol-1-yl, imidazol-1-yl, or substituted imidazol-1-yl containing up to three substituents selected from lower alkyl and phenyl.

In the present specification and claims, the term "lower alkyl" denotes the presence of an alkyl group containing from 1, to 2, to 3, to 4 carbon atoms and 1 and 2 and 3 and 4 carbon atoms, that is, methyl, ethyl, n-propyl, isopropyl, n-butyl, sec-butyl, isobutyl, and t-butyl.

The compounds of the present invention are crystalline solids at room temperature. They are useful as pesticides for the control of a wide variety of arachnid, fungal, plant, and insect pests, for example, mites, ticks, the causative agents of apple scab and potato late blight, pigweeds, bindweed, worms, flies, beetles, and roaches. They are particularly useful as acaricides for the control of mites and ticks. Representative compounds of the present invention include:

2-phenylimidazol-1-yltricyclohexyltin,
2,4-diphenylimidazol-1-yltricyclohexyltin,
2,4-dimethylimidazol-1-yltricyclohexyltin,
2,4,5-trimethylimidazol-1-yltricyclohexyltin,
2-phenyl-5-ethylimidazol-1-yltricyclohexyltin,
2-phenyl-4-methyl-5-(n-propyl)imidazol-1-yltricyclo-
  hexyltin,
2,5-diphenyl-4-(n-butyl)imidazol-1-yltricyclohexyltin, and
2,4,5-triisopropylimidazol-1-yltricyclohexyltin.

The compounds of the present invention are prepared by reacting together tricyclohexyltin chloride and an organolithium compound of the Formula II:

Li—R                                         (II)

The reaction proceeds smoothly at temperatures of from about 0° C. to about 100° C. and conveniently at the boiling point of the reaction mixture and under reflux. The reaction is conducted in inert anhydrous organic liquid reaction medium. Suitable media include the common organic solvents or mixtures thereof such as ether, tetrahydrofuran, hexane, benzene and so forth. The amounts of the reactants employed are not critical, some of any of the desired products being formed when employing any proportions of reagents. However, the reaction consumes the reagents in the proportion of one mole of tricyclohexyltin chloride per mole of organolithium compound and the employment of such proportions is usually preferred. The reaction is conducted under anhydrous conditions and, preferably, substantially to completion under a dry, inert atmosphere such as argon, nitrogen, and so forth.

In conducting the reaction, the tricyclohexyltin chloride, Li—R compound, and liquid reaction medium are contacted with one another in any convenient order or fashion. In a preferred manner, the tricyclohexyltin chloride is added to a solution of Li—R reactant dispersed in liquid reaction medium. These reactants are then maintained together within the given temperature range for a period of time sufficient to complete the reaction. The reaction mixture is then conventionally processed to separate and isolate product. Such processing includes filtration, extraction, distillation, chromatography, and the like.

The following examples illustrate the present invention but are not to be construed as limiting.

EXAMPLE 1

2,4,5-triphenylimidazol-1-yltricyclohexyltin

The 2,4,5-triphenylimidazol-1-yl lithium salt is prepared by reacting 2,4,5-triphenylimidazole with n-butyllithium. In such operation, n-butyllithium (0.042 mole) dispersed in 28 milliliters of n-hexane is added portionwise with stirring at room temperature to 10.8 grams (0.036 mole) of 2,4,5-triphenylimidazole dispersed in 300 milliliters of dry tetrahydrofuran. This addition is conducted under a dry nitrogen atmosphere. While maintaining the nitrogen atmosphere and continuing the stirring, the temperature of the resultant mixture is raised to the boiling temperature and maintained thereat and under reflux to complete the reaction. Tricyclohexyltin chloride (16.0 grams, 0.0396 mole) dispersed in 100 milliliters of dry tetrahydrofuran is added with stirring at room temperature to the above prepared reaction mixture containing the 2,4,5-triphenylimidazol-1-yl lithium salt. This addition is carried out under a nitrogen atmosphere, and over a period of 5–30 minutes. The resultant mixture is then stirred for three hours at the boiling point and under reflux. Following this period, it is cooled, filtered and the filtrate is poured into water which results in a suspended solid. This suspended solid is removed by filtration, rinsed well with water and dried to give the desired 2,4,5-triphenylimidazol-1-yltricyclohexyltin product as a white solid having a melting point of 257° C. Calculated: 17.9 percent Sn. Found: 17.2 percent Sn.

EXAMPLE 2

Imidazol-1-yltricyclohexyltin

The following reaction is carried out under a dry, nitrogen atmosphere. Imidazole (1.4 grams; 0.021 mole) is dispersed in 200 milliliters of dry tetrahydrofuran. To the resultant solution is added 14 milliliters of a 1.5 N solution of n-butyllithium in hexane (0.021 mole of n-butyllithium) to prepare a mixture containing the imidazol-1-yl lithium salt. The addition is performed with stirring, dropwise, over a period of 1–2 minutes, and at room temperature. The resulting mixture which contains the imidazol-1-yl lithium salt is then stirred for ten minutes. Following this period, a solution of 8.0 grams (0.020 mole) of tricyclohexyltin chloride dispersed in 100 milliliters of dry tetrahydrofuran is added dropwise over a 5–30 minute period and the resulting solution is stirred at the boiling point and under reflux for six hours. It is then evaporated to dryness in vacuo to obtain a solid residue. This reidual solid is finely ground, stirred with 75 milliliters of water, and filtered. The remaining white solid is dried in vacuo to obtain the imidazol-1-yltricyclohexyltin product having a melting point of 200° C.

EXAMPLE 3

4,5-benzotriazol-1-yltricyclohexyltin

The 4,5-benzotriazol-1-yl lithium salt is prepared by dispersing 4.8 grams (0.046 mole) of benzotriazole in 200 milliliters of dry tetrahydrofuran and, while maintaining the resulting solution under a dry nitrogen atmosphere at room temperature, adding thereto 28 milliliters of a 1.5 N n-butyllithium (0.042 mole) in hexane solution in a dropwise fashion over a period of 2–5 minutes. Following the addition, the mixture is stirred at room temperature for ½ hour and is then heated to the boiling point and under reflux. Upon reaching reflux, there is added thereto a solution of 16.0 grams (0.0396 mole) of tricyclohexyltin chloride in 100 milliliters of tetrahydrofuran. During this addition, the nitrogen atmosphere is maintained and the resulting mixture is heated at the boiling point and under reflux for three hours. It is then evaporated to dryness in vacuo and the residual solid is suspended in water, collected and dried to obtain the 4,5-benzotriazol-1-yltricyclohexyltin product as a white solid melting at about 185°–190° C.

EXAMPLE 4

2-methylimidazol-1-yltricyclohexyltin

In a manner analogous to those set forth in the preceding examples, the lithium salt of 2-methylimidazole and tricyclohexyltin are reacted together to obtain the 2-methylimidazol-1-yltricyclohexyltin product as a white solid melting at from 145°–150° C.

EXAMPLE 5

4,5-benzimidazol-1-yltricyclohexyltin

The lithium salt of benzimidazole (0.04 mole) is dispersed in 300 milliliters dry tetrahydrofuran at room temperature. To the resultant solution is added a solution containing 16 grams (0.04 mole) of tricyclohexyltin chloride dispersed in 100 milliliters dry tetrahydrofuran. This addition is conducted in a dropwise fashion under a dry nitrogen atmosphere at room temperature. The resulting mixture is stirred at the boiling point and under reflux for four hours and then evaporated to dryness. The residue is dissolved in chloroform and filtered to remove lithium chloride. The filtrate is evaporated in vacuo to provide the 4,5-benzimidazol-1-yltricyclohexyltin product as a white solid melting at from 133°–136° C.

In accordance with the foregoin procedures, the following are prepared.

2-ethylimidazol-1-yltricyclohexyltin (molecular weight 463.3) from the lithium salt of 2-ethylimidazole and tricyclohexyltin chloride.

2-isopropylimidazol - 1 - yltricyclohexyltin (molecular weight 477.3) from the lithium salt of 2-isopropylimidazole and tricyclohexyltin chloride.

2-isobutylimidazol - 1 - yltricyclohexyltin (molecular weight 491.3) from the lithium salt of 2-isobutylimidazole and tricyclohexyltin chloride.

2,5-dimethylimidazol - 1 - yltricyclohexyltin (molecular weight 464.3) from the lithium salt of 2,5-dimethylimidazole and tricyclohexyltin chloride.

5 - phenylimidazol - 1 - yltricyclohexyltin (molecular weight 499.3) from the lithium salt of 5-phenylimidazole and tricyclohexyltin chloride.

4-(t-butyl)imidazol - 1 - yltricyclohexyltin (molecular weight 491.3) from the lithium salt of 4-(t-butyl)imidazole and tricyclohexyltin chloride.

The compounds of the present invention are useful as pesticides for the control of a wide variety of household and agricultural arachnid, fungal, plant an insect pests such as mites, ticks, *Bacillus subtilis,* bread mold fungus, pigweeds, Daphnia, worms, and flies. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative opeartions, each of imidazol-1-yltricyclohexyltin, 4,5-benzotriazol-1-yltricyclohexyltin, and 2,4,5-triphenylimidazol - 1 - yltricyclohexyltin gives complete controls and kills of two-spotted spider mites when the latter are separately contacted with compositions containing, as the sole toxicant, one of the named compounds at a concentration of 500 parts per million by weight.

In further representative operations, imidazol-1-yltricyclohexyltin and 2-methylimidazol-1-yltricyclohexyltin give substantially complete controls and kills a *Staphylococcus aureus,* when each are separately employed as the sole toxicant in aqueous compositions at concentrations of 500 parts per million by weight.

In still further operation, 4,5-benzimidazol-1-yltricyclohexyltin gives substantially complete controls and kills of pigweeds when an aqueous composition of this compound, as the sole toxicant, is applied at a pre-emergent stage to the growth medium thereof at a dosage of ten pounds per acre.

The starting compounds hereof are prepared via known methods. Tricyclohexyltin chloride can be prepared by the Grignard reaction of cyclohexylmagnesium halide and tin tetrachloride. The Li—R compounds are prepared via an exchange reaction of the corresponding H—R compound and n-butyllithium or phenyllithium. This reaction is conducted in anhydrous liquid reaction medium, preferably under an inert atmosphere. The H—R compounds are known. The substituted imidazole H—R compounds can be prepared by means of a condensation of a dicarbonyl compound with an aldehyde and ammonia (Radziszewski Synthesis). Thus, by reacting glyoxal and ammonia with a number of lower alkyl and phenyl aldehydes, the 2-substituted imidazoles are obtained. The condensation of an α-ketoaldehyde with ammonia and formaldehyde produces the 4(or 5)-monosubstituted imidazoles. The formation of the 2,4(or 5)-disubstituted imidazoles results by the combination of an α-ketoaldehyde with a substituted aldehyde. An α-diketone when condensed with formaldehyde or substituted aldehyde gives the 4,5-disubstituted or 2,4,5-trisubstituted imidazoles. These condensations are usually conducted in alcoholic ammonia.

What is claimed is:

1. The compound corresponding to the formula

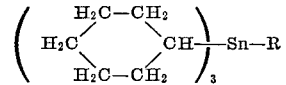

wherein R represents 4,5-benzotriazol-1-yl, 4,5-benzimidazol-1-yl, imidazol-1-yl, or substituted imidazol-1-yl containing up to three substituents selected from lower alkyl and phenyl.

2. The compound claimed in claim 1 which is 4,5-benzotriazol-1-yltricyclohexyltin.

3. The compound claimed in claim 1 which is 4,5-benzimidazol-1-yltricyclohexyltin.

4. The compound claimed in claim 1 which is imidazol-1-yltricyclohexyltin.

5. The compound claimed in claim 1 which is 2,4,5-triphenylimidazol-1-yltricyclohexyltin.

6. The compound claimed in claim 1 which is 2-methyl-imidazol-1-yltricyclohexyltin.

References Cited

UNITED STATES PATENTS 2,713,580  7/1955  Stefl et al. _____ 260—299

ALEX MAZEL, Primary Examiner

R. J. GALLAGHER, Assistant Examiner

U.S. Cl. X.R.

71—92; 260—308, 309, 429.7; 424—245